(12) United States Patent
Lin

(10) Patent No.: US 10,612,550 B2
(45) Date of Patent: Apr. 7, 2020

(54) ELECTRIC FUEL PUMP

(71) Applicant: TRICORE CORPORATION, Taichung (TW)

(72) Inventor: Po-Liang Lin, Taichung (TW)

(73) Assignee: TRICORE CORPORATION, Taichung (TW)

( * ) Notice: Subject to any disclaimer, the term of this patent is extended or adjusted under 35 U.S.C. 154(b) by 369 days.

(21) Appl. No.: 15/623,788

(22) Filed: Jun. 15, 2017

(65) Prior Publication Data

US 2017/0363052 A1 Dec. 21, 2017

(30) Foreign Application Priority Data

Jun. 15, 2016 (TW) .............................. 105118750 A

(51) Int. Cl.

| F04D 5/00 | (2006.01) |
|---|---|
| H02K 3/44 | (2006.01) |
| H02K 11/33 | (2016.01) |
| F02M 37/04 | (2006.01) |
| H02K 5/22 | (2006.01) |
| F02M 37/08 | (2006.01) |

(52) U.S. Cl.
CPC ............ *F04D 5/002* (2013.01); *F02M 37/048* (2013.01); *F02M 37/08* (2013.01); *H02K 3/44* (2013.01); *H02K 5/225* (2013.01); *H02K 11/33* (2016.01); *F02M 2037/085* (2013.01)

(58) Field of Classification Search
CPC ...... F02M 51/04; F02M 37/08; F02M 37/048; F02M 2037/085; H02K 11/33; H02K 7/14; H02K 5/225; H02K 3/44; H02K 5/20; F04D 29/5806; F04D 29/181; F04D 5/002; F04D 5/008; F04D 13/0693; F04D 13/0646

See application file for complete search history.

(56) References Cited

U.S. PATENT DOCUMENTS

| 6,042,349 | A * | 3/2000 | Ito ............................ H02K 3/28 417/423.7 |
|---|---|---|---|
| 7,057,318 | B2 * | 6/2006 | Strobl .................... F02M 37/08 310/89 |
| 7,560,839 | B2 * | 7/2009 | Sumiya ................ F02M 37/048 310/43 |
| 7,950,907 | B2 * | 5/2011 | Nagata ................. F02M 37/048 417/366 |

(Continued)

*Primary Examiner* — Nathan C Zollinger
(74) *Attorney, Agent, or Firm* — Muncy, Geissler, Olds & Lowe, PC

(57) ABSTRACT

An electric fuel pump includes a housing having an oil inlet and an oil outlet, an impeller, a stator unit mounted in the housing and including a stator and a starter terminal set connected to the stator, a packaging adhesive encapsulating the stator and the starter terminal set to create an oil guide passage in communication between the oil inlet and the oil outlet, and a rotor unit mounted in the housing and including a rotor rotatably mounted in the stator and a rotating shaft mounted in the rotor and connected with the impeller. When the stator unit is electrically conducted, the rotor unit drives the impeller to draw a fuel oil into the oil guide passage. When the fuel oil goes through the oil guide passage, the stator and the starter terminal set are well protected by the packaging adhesive and prohibited from contacting the fuel oil.

7 Claims, 4 Drawing Sheets

(56) References Cited

U.S. PATENT DOCUMENTS

| | | | | |
|---|---|---|---|---|
| 8,288,903 B2* | 10/2012 | Matsuda | ................ | H02K 1/148 |
| | | | | 310/43 |
| 8,734,133 B2* | 5/2014 | Tanahashi | ............... | F04D 5/002 |
| | | | | 310/71 |
| 10,148,150 B2* | 12/2018 | Nagata | ................... | F02M 37/08 |
| 10,184,475 B2* | 1/2019 | Fischer | ................... | H02K 5/20 |
| 2003/0173925 A1* | 9/2003 | Strobl | ................... | F02M 37/08 |
| | | | | 318/543 |
| 2005/0074343 A1* | 4/2005 | Naito | ..................... | F04D 5/002 |
| | | | | 417/423.3 |
| 2009/0191074 A1* | 7/2009 | Suzuki | ................... | F04D 13/06 |
| | | | | 417/423.7 |
| 2016/0201692 A1* | 7/2016 | Ootake | ................. | F02M 37/08 |
| | | | | 417/423.12 |
| 2017/0023016 A1* | 1/2017 | Fischer | ................... | H02K 5/20 |

* cited by examiner

ELECTRIC FUEL PUMP

BACKGROUND OF THE INVENTION

1. Field of the Invention

The present invention relates to pump technology and more particularly, to an electric fuel pump that offers high durability.

2. Description of the Related Art

An electric fuel pump is adapted for transporting a certain pressure fuel oil through a piping to a carburetor so that the engine can be smoothly started to output torque. In conventional electric fuel pump system, an armature assembly and a pump unit are respectively placed in a yoke pipe assembly and then connected together. When the armature assembly is started to rotate, an impeller of the pump unit is rotated to boost the pressure of the fuel oil and to force the pressure-increased fuel oil out of the pump unit through the yoke pipe assembly to the carburetor via an oil outlet of a top cover assembly.

However, in the conventional electric fuel pump system, the armature assembly is kept in direct contact with the fuel oil. After a long use, the armature assembly is vulnerable to fuel corrosion, causing structural damage and affecting the performance. Thus, the structural durability of the conventional electric fuel pump system is not good enough.

SUMMARY OF THE INVENTION

The present invention has been accomplished under the circumstances in view. It is the main object of the present invention to provide an electric fuel pump, which avoids fuel oil damage to the structure, prolonging the lifespan and enhancing the durability.

To achieve this and other objects of the present invention, an electric fuel pump comprises a housing, a pressure booster, a stator unit and a rotor unit. The housing defines an oil inlet and an oil outlet. The pressure booster is mounted in the housing, comprising an impeller seat and an impeller. The impeller seat comprises an oil hole. The impeller is rotatably mounted in the impeller seat between the oil inlet of the housing and the oil hole of the impeller seat, and adapted for sucking a fuel oil into the housing to increase its pressure and then forcing the high-pressure fuel oil out of the impeller seat through the oil hole. The stator unit is mounted in the housing, comprising a stator and a starter terminal set. The starter terminal set is mounted at one end of the stator and encapsulated with the stator in a packaging adhesive so that an oil guide passage is created inside the stator and the starter terminal set. The oil guide passage has two opposite ends thereof respectively connected to the oil outlet of the housing and the oil hole of the impeller seat of the pressure booster so that the fuel oil can be delivered from the oil hole of the impeller seat through the oil guide passage to the oil outlet of the housing. The rotor unit is mounted in the housing, comprising a rotor, a magnet and a rotating shaft. The rotor is rotatably mounted in the stator. The magnet is mounted between the stator and the rotor. The rotating shaft extends through the rotor, having one end thereof rotatably inserted into the stator unit and an opposite end thereof connected with the impeller of the pressure booster. Thus, when the stator unit is electrically conducted, the rotating shaft of the rotator unit drives the impeller of the pressure booster to rotate.

Thus, the electric fuel pump of the present invention uses the packaging adhesive to protect the stator and the starter terminal set, prohibiting the stator and the starter terminal set from contacting the fuel oil when the fuel oil is being delivered through the oil guide passage. Thus, the invention effectively prolongs the lifespan of the electric fuel pump and enhances the durability of the electric fuel pump while maintaining a stable operating performance.

In the present invention, the stator comprises a stator iron core. The stator iron core comprises a plurality of magnetically permeable members equiangularly spaced from one another so that a diversion space is defined between each two adjacent magnetically permeable members. The starter terminal set comprises a terminal block. The terminal block is connected to one end of the stator iron core, comprising an axle tube and a plurality of draft tubes spaced around the axle tube. The rotating shaft is rotatably inserted into the axle tube. The draft tubes are respectively connected to the diversion spaces of the stator iron core. Thus, the draft tubes of the terminal block and the diversion spaces of the stator iron core form the oil guide passage.

In the present invention, the stator iron core of the stator comprises at least one positioning rod; the terminal block comprises at least one positioning groove respectively engaged with the at least one positioning rod of the stator iron core, enhancing installation convenience.

Other advantages and features of the present invention will be fully understood by reference to the following specification in conjunction with the accompanying drawings, in which like reference signs denote like components of structure.

DETAILED DESCRIPTION OF THE INVENTION

Figure 1:
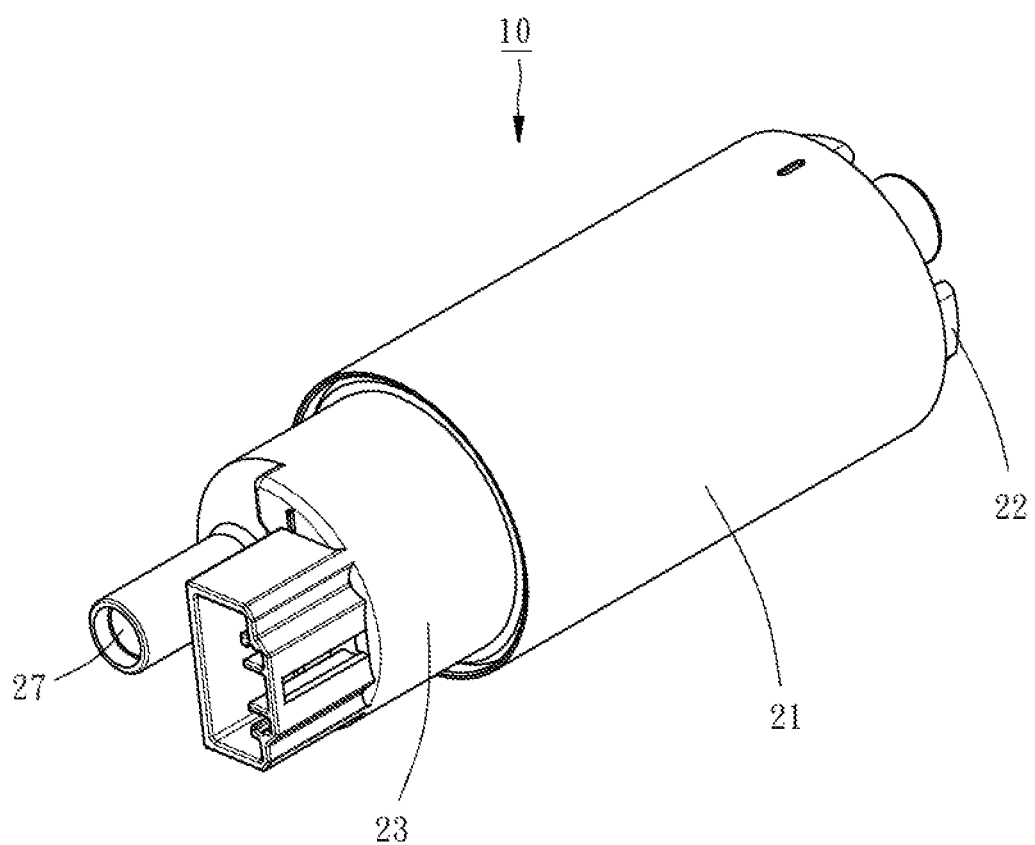
FIG. 1 is an oblique top elevational view of an electric fuel pump in accordance with the present invention.
Figure 2:
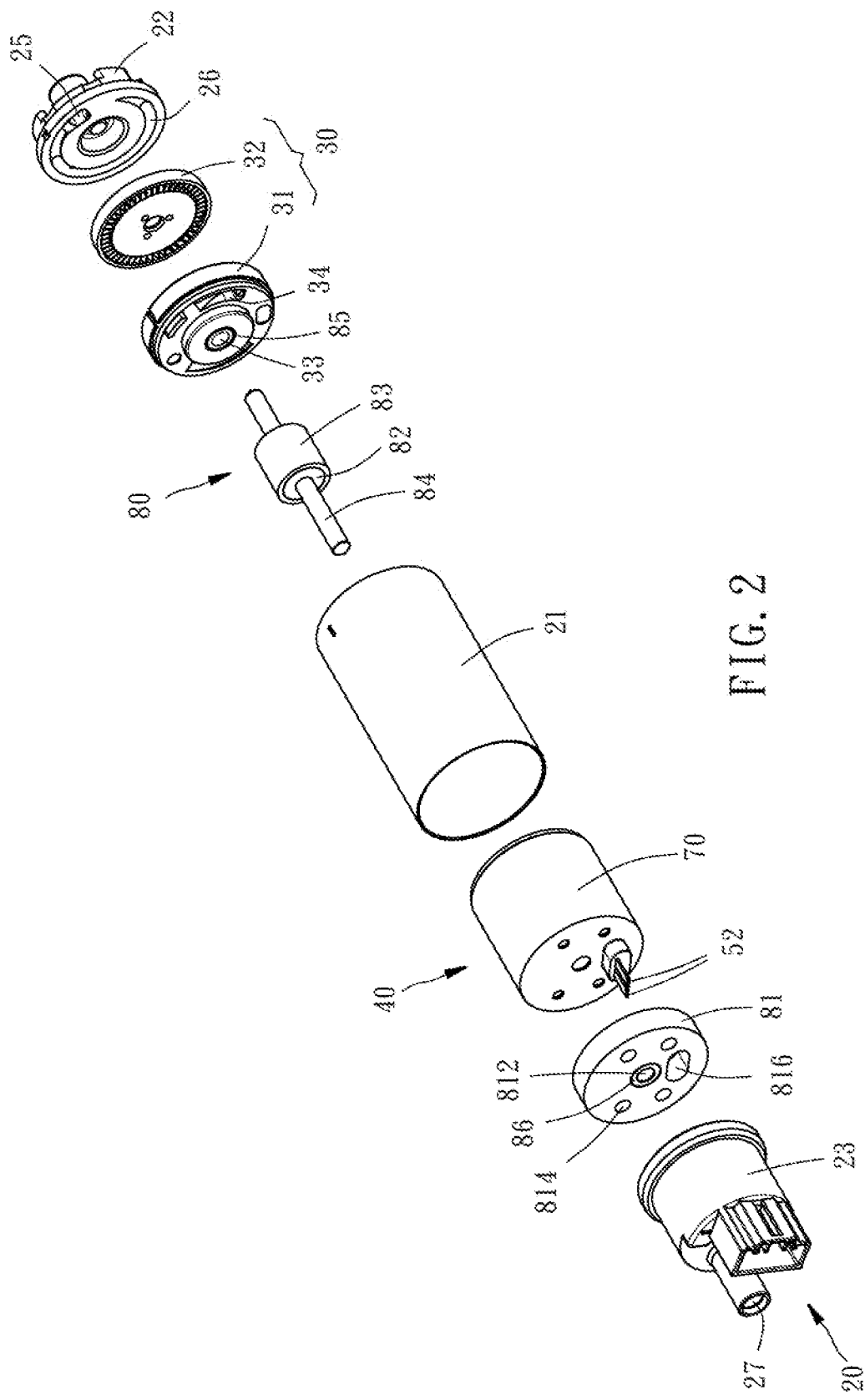
FIG. 2 is an exploded view of the electric fuel pump in accordance with the present invention.

Referring to FIGS. 1 and 2, an electric fuel pump 10 in accordance with the present invention is shown. The electric fuel pump 10 comprises a housing 20, a pressure booster 30, a stator unit 40, and a rotor unit 80.

The housing 20 comprises a tubular housing body 21, an inlet end cap 22, an outlet end cap 23, and a pair of power supply terminals 24. The inlet end cap 22 is fastened to one end of the tubular housing body 21, comprising an oil inlet 25 cut through opposing front and inner ends thereof and an arc runner 26 located the inner end. The arc runner 26 has one end thereof connected to the oil inlet 25. The outlet end cap 23 is fastened to an opposite end of the tubular housing body 21, comprising an oil outlet 27 cut through opposing front and inner ends thereof. The power supply terminals 24 are mounted at the outlet end cap 23, as shown in FIG. 4, for connection to an external power source (not shown).

The pressure booster 30 is mounted in the tubular housing body 21 of the housing 20, comprising an impeller seat 31 and an impeller 32. The impeller seat 31 comprises a rear axle hole 33 located at the center thereof, and an oil hole 34 spaced around the rear axle hole 33 and disposed in communication with the oil inlet 25 of the housing 20. The impeller 32 is rotatably mounted in the impeller seat 31 between the oil inlet 25 of the housing 20 and the oil hole 34 of the impeller seat 31.

Figure 3:
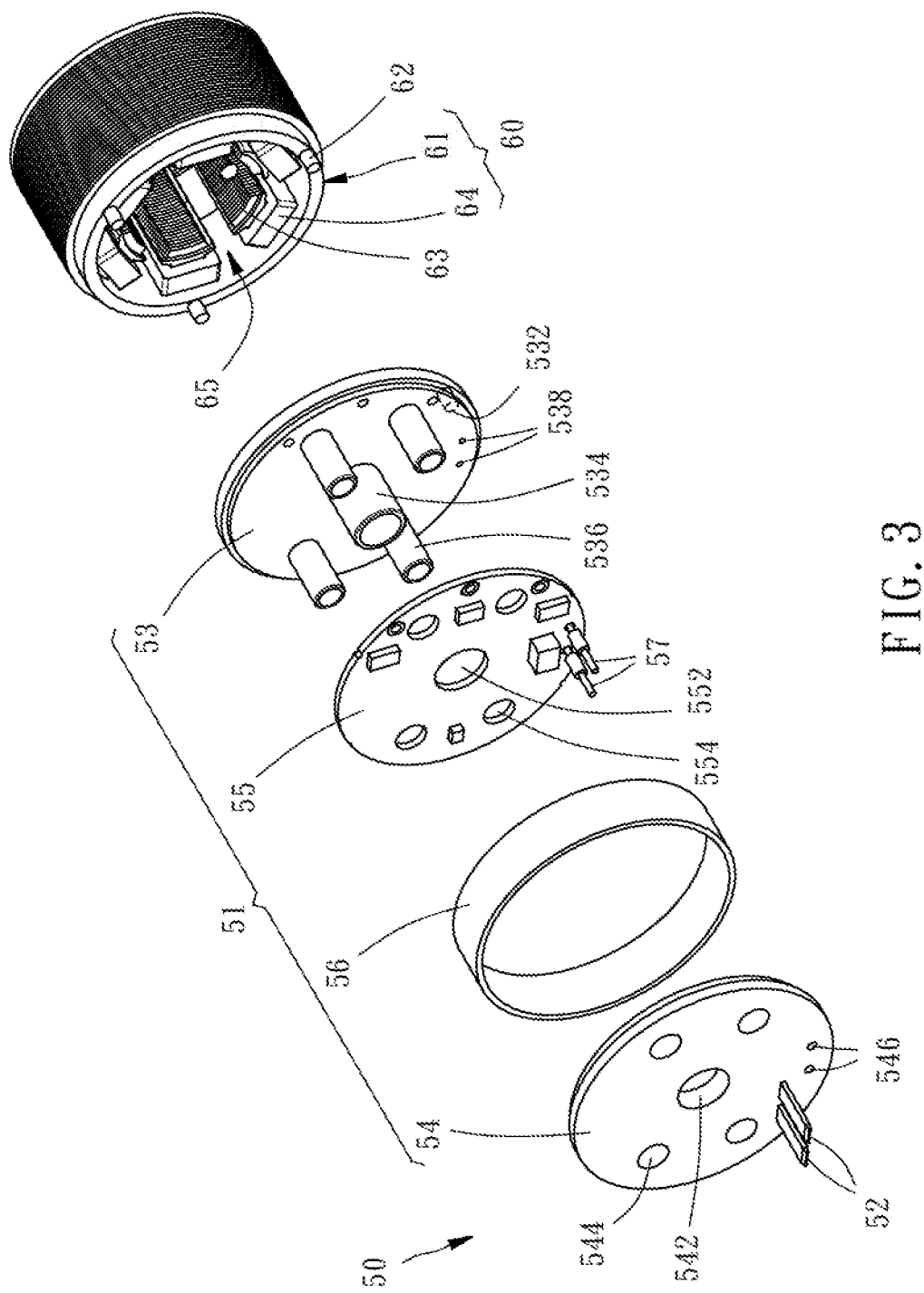
FIG. 3 is an exploded view of the stator unit of the electric fuel pump in accordance with the present invention.
Figure 4:
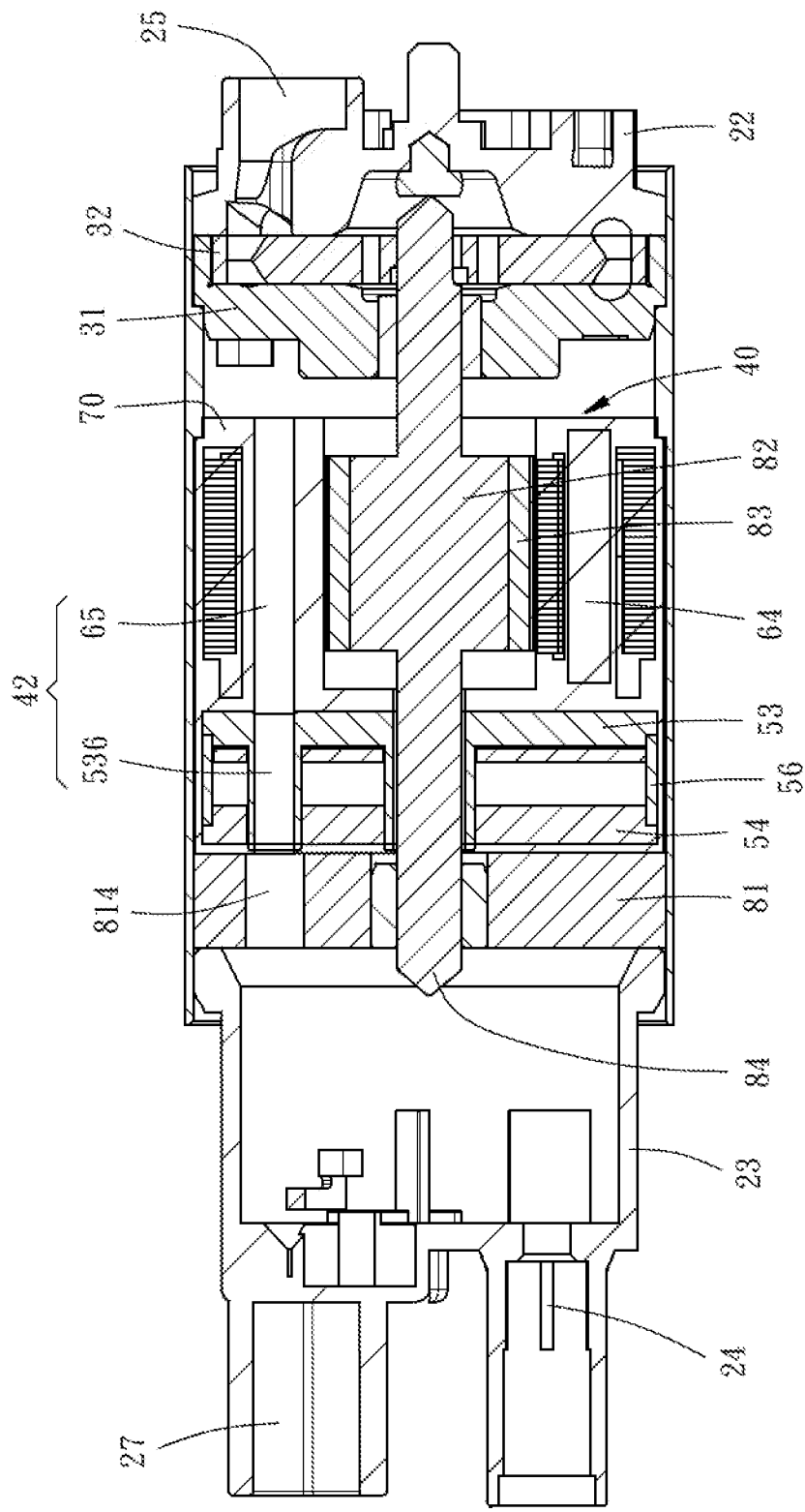
FIG. 4 is a sectional side view of the electric fuel pump in accordance with the present invention.

As illustrated in FIGS. 3 and 4, the stator unit 40 comprises a starter terminal set 50 consisting of a terminal block 51 and a pair of starter terminals 52. The terminal block 51 comprises a back cover 53, a front cover 54, and a circuit board 55.

The back cover 53 comprises three positioning grooves 532 equiangularly located on one side thereof, an axle tube 534 perpendicularly extended from an opposite side thereof at the center, four draft tubes 536 equiangularly spaced around the axle tube 534, and a pair of rear pin holes 538.

The front cover 54 comprises a first through hole 542 located at the center, and four first coupling holes 544 equiangularly spaced around the first through hole 542. The front cover 54 is assembled with the back cover 53 by coupling the first through hole 542 and the first coupling holes 544 to the axle tube 534 and draft tubes 536 of the back cover 53 respectively with a metal connection ring 56 set between the front cover 54 and the back cover 53 around the border area. The front cover 54 further comprises a pair of front pin holes 546.

The circuit board 55 is mounted between the front cover 54 and the back cover 53, comprising a second through hole 552 located at the center and four second coupling holes 554 equiangularly spaced around the second through hole 552. The second through hole 552 and second coupling holes 554 of the circuit board 55 are respectively coupled to the axle tube 534 and draft tubes 536 of the back cover 53. The circuit board 55 further comprises two conducting pins 57 that are inserted with respective opposing front and rear ends thereof into the front pin holes 546 of the front cover 54 and the rear pin holes 538 of the back cover 53.

The starter terminals 52 are mounted on one side of the front cover 54 opposite to the back cover 53, and electrically connected with respective one ends thereof to the power supply terminals 24 of the housing 20 and respective opposite ends thereof to the pins 57 of the circuit board 55.

On the other hand, the stator unit 40 further comprises a stator 60. The stator 60 comprises a stator iron core 61 and six coil sets 64. The stator iron core 61 comprises three positioning rods 62 equiangularly located at one end thereof opposite to the pressure booster 30, and six magnetically permeable members 63 equiangularly spaced around the inner perimeter thereof and respectively surrounded by one respective coil set 64.

When assembling the stator 60 and the starter terminal set 50, insert the positioning rods 62 of the stator iron core 61 into the respective positioning grooves 532 of the back cover 53 of the terminal block 51, and then solder one respective lead-out end (not shown) of each coil set 64 to the pins 57 of the circuit board 55 of the terminal block 51. After assembled the stator 60 and the starter terminal set 50, encapsulate the stator 60 and the starter terminal set 50 with a packaging adhesive 70 using insert molding technology. At this time, the packaging adhesive 70 seals up the inner and outer perimeters of the stator iron core 61 and the coil sets 64, causing formation of a diversion space 65 between each two adjacent magnetically permeable members 63. The starter terminal set 50 allows the overall outer perimeter of the terminal block 51 to be sealed up by the packaging adhesive 70, leaving the starter terminals 52 partially exposed to the outside of the packaging adhesive 70 for connection to the power supply terminals 24 of the housing 20. At this time, the draft tubes 536 are kept open. Thus, as shown in FIG. 4, four diversion spaces 65 in the stator iron core 61 are respectively connected with the four draft tubes 536 of the terminal block 51, creating an oil guide passage 42 that has one end thereof disposed in communication with the oil hole 34 of the impeller seat 31 and an opposite end thereof disposed in communication with the oil outlet 27 of the housing 20.

The rotor unit 80 is mounted in the tubular housing body 21 of the housing 20, comprising a bearing seat 81, a rotor 82, a magnet 83 and a rotating shaft 84. The bearing seat 81 is abutted against one end of the packaging adhesive 70, comprising a front axle hole 812 located at the center of one end thereof and connected to the axle tube 534 of the back cover 53 of the terminal block 51 and four pilot holes 814 spaced around the front axle hole 812 and respectively connected to the draft tubes 536 of the back cover 53 of the terminal block 51. The bearing seat 81 further comprises a terminal slot 816 for accommodating the starter terminals 52 of the stator unit 40. The rotor 82 is mounted in the stator 60 and surrounded by the magnetically permeable members 63 of the stator iron core 61. The magnet 83 is mounted on the outer perimeter of the rotor 82 to face toward the magnetically permeable members 63 of the stator iron core 61. The rotating shaft 84 is mounted in the rotor 82, having one end thereof inserted through and supported on a first axle bearing 85 in the rear axle hole 33 of the impeller seat 31 and then connected with the impeller 32 and an opposite end thereof inserted through the axle tube 534 of the terminal block 51 into a second axle bearing 86 and supported by the second axle bearing 86 in the front axle hole 812 of the bearing seat 81.

When the power supply terminals 24 and the starter terminals 52 are electrically conducted to transmit electricity through the coil sets 64, a rotating magnetic field is generated. This rotating magnetic field being created by the stator 60 induces an electric current in the rotor 82 resulting in another magnetic field. This induced magnetic field from the rotor 82 interacts with the rotating magnetic field, causing the rotor 82 to rotate. During rotation of the rotor 82, the rotating shaft 84 drives the impeller 32 to rotate, causing generation of a vacuum suction force that draws a fuel oil from the oil inlet 25 of the housing 20 into the inside of the housing 20, enabling the fuel oil to flow through the arc runner 26 of the inlet end cap 22 into the impeller 32. At this time, the pressure of the fuel oil is increased subject to rotation of the impeller 32 at a high speed. The high pressure fuel oil is then guided to flow through the oil hole 34 of the impeller seat 31 to the oil guide passage 42 of the stator unit 40 and then to flow out of the oil guide passage 42 of the stator unit 40 through the pilot holes 814 of the bearing block 81 to the outlet end cap 23 of the housing 20, and finally to flow out of the housing 20 through the oil outlet 27 of the outlet end cap 23.

When the fuel oil is flowing through the oil guide passage 42 of the stator unit 40, the starter terminal set 50 and the stator 60 are well protected by the packaging adhesive 70, prohibiting the circuit board 55 and the coil sets 64 from contacting the fuel oil. Thus, the invention achieves the targets of prolonging the lifespan of the electric fuel pump and enhancing the durability of the electric fuel pump while maintaining a stable operating performance.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An electric fuel pump, comprising:
a housing comprising an oil inlet and an oil outlet;
a pressure booster mounted in said housing, said pressure booster comprising an impeller seat and an impeller, said impeller seat comprising an oil hole, said impeller being rotatably mounted in said impeller seat between said oil inlet of said housing and said oil hole of said impeller seat;
a stator unit mounted in said housing, said stator unit comprising a starter terminal set, a stator and a packaging adhesive, said stator having one end thereof connected to said starter terminal set, said packaging adhesive encapsulating said starter terminal set and said stator in such a manner that an oil guide passage is created inside said starter terminal set and said stator, said oil guide passage having two opposite ends thereof respectively disposed in communication with said oil outlet of said housing and said oil hole of said impeller seat of said pressure booster; and
a rotor unit mounted in said housing, said rotor unit comprising a rotor, a magnet and a rotating shaft, said rotor being rotatably mounted in said stator, said magnet being set between said stator and said rotor, said rotating shaft being axially extended through said rotor for rotation with said rotor, said rotating shaft having one end thereof rotatably inserted into said stator unit and an opposite end thereof fixedly connected with said impeller of said pressure booster;
wherein said stator comprises a stator iron core, said stator iron core comprising a plurality of magnetically permeable members equiangularly spaced from one another and a diversion space defined between each two adjacent said magnetically permeable member; said starter terminal set comprises a terminal block connected to one end of said stator iron core, said terminal block comprising an axle tube rotatably sleeved onto said rotating shaft and a plurality of draft tubes spaced around said axle tube and respectively connected to the respective said diversion space of said stator iron core, said draft tubes of said terminal block and said diversion space of said stator iron core forming said oil guide passage.

2. The electric fuel pump as claimed in claim 1, wherein said housing comprises a tubular housing body that holds said pressure booster and said stator unit therein, an inlet end cap capped on one end of said tubular housing body and an outlet end cap capped on an opposite end of said tubular housing body, said inlet end cap comprising said oil inlet for guiding a fuel oil into said tubular housing body, said outlet end cap comprising said oil outlet for guiding said fuel oil out of said tubular housing body.

3. The electric fuel pump as claimed in claim 2, wherein said inlet end cap of said housing further comprises an arc runner located on one side thereof and facing toward said impeller, said arc runner having one end thereof connected to said oil inlet.

4. The electric fuel pump as claimed in claim 1, wherein said terminal block comprises a back cover, a front cover, a circuit board and a metal connection ring, said back cover having one side thereof connected to said stator iron core of said stator and an opposite side thereof carrying said axle tube and said draft tubes, said front cover comprising a first through hole coupled to said axle tube of said back cover and a plurality of first coupling holes respectively coupled to said draft tubes of said back cover, said circuit board being mounted between said front cover and said back cover, said circuit board comprising a second through hole coupled to said axle tube of said back cover and a plurality of second coupling holes respectively coupled to said draft tubes of said back cover, said metal connection ring being connected between said front cover and said back cover to surround said circuit board; said stator further comprises a plurality of coil sets respectively mounted on said magnetically permeable members of said stator iron core and electrically connected to said circuit board of said terminal block.

5. The electric fuel pump as claimed in claim 4, wherein said back cover of said terminal block comprises at least one positioning groove; said stator iron core of said stator comprises at least one positioning rod respectively fastened to said at least one positioning groove of said back cover of said terminal block.

6. The electric fuel pump as claimed in claim 4, wherein said housing further comprises a pair of power supply terminals; said starter terminal set further comprises a pair of starter terminals located at said front cover and electrically connected to said power supply terminals of said housing and said circuit board and partially exposed to the outside of said packaging adhesive.

7. The electric fuel pump as claimed in claim 1, wherein said rotor unit further comprises a bearing seat abutted against one end of said packaging adhesive, said bearing seat comprising a front axle hole rotatably coupled to one end of said rotating shaft and a plurality of pilot holes disposed in communication between said oil guide passage and said oil outlet of said housing.

\* \* \* \* \*